Figure 1:
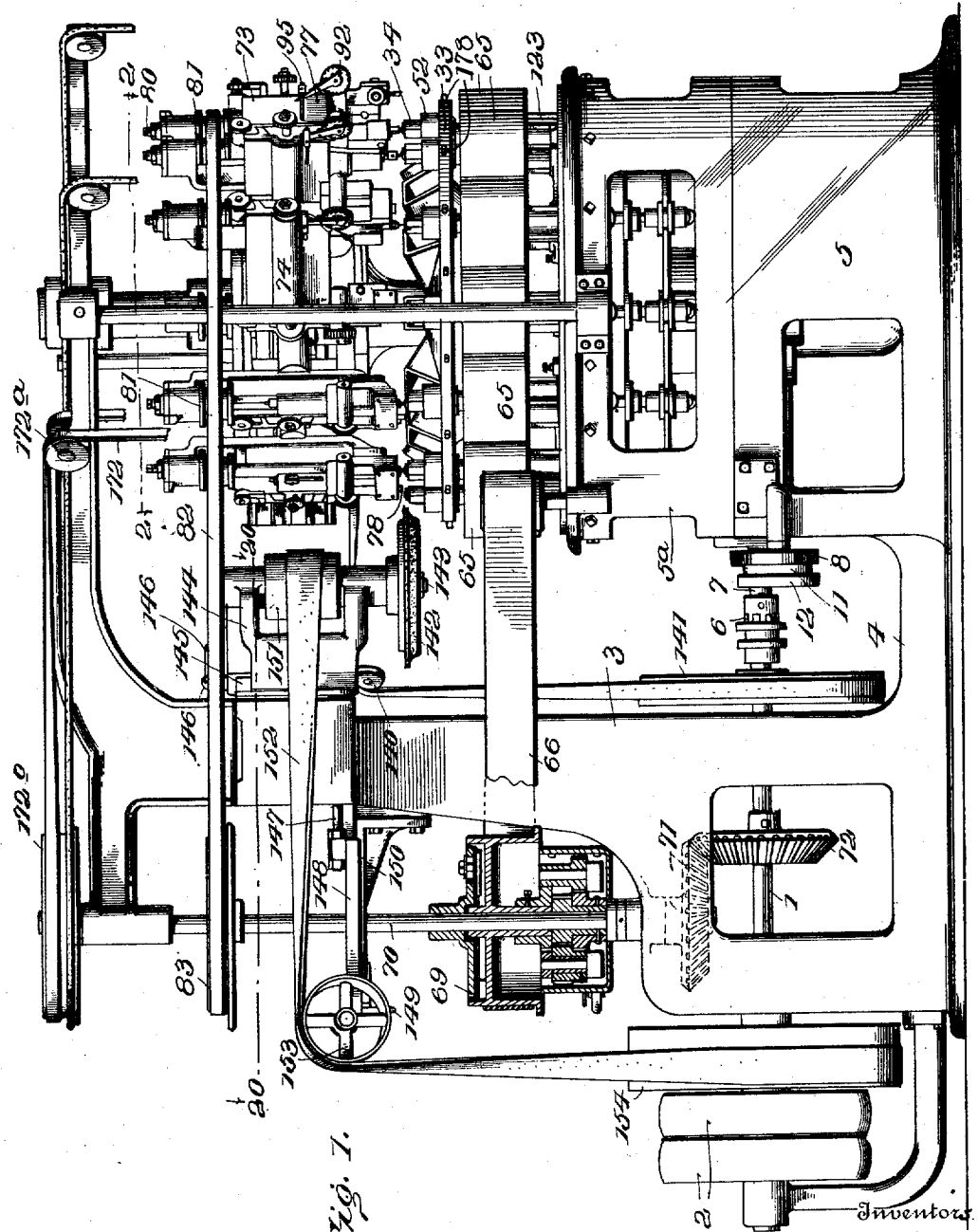

P. F. DUSHA, A. FEYK & J. KOMANCSEK.
BUTTON MAKING MACHINE.
APPLICATION FILED DEC. 28, 1911.

1,121,337.

Patented Dec. 15, 1914.

13 SHEETS—SHEET 1.

Witnesses

Inventors
P. F. Dusha,
A. Feyk and
J. Komancsek.
By
A. V. Stacy, Attorney.

P. F. DUSHA, A. FEYK & J. KOMANCSEK.
BUTTON MAKING MACHINE.
APPLICATION FILED DEC. 28, 1911.
1,121,337.
Patented Dec. 15, 1914.
13 SHEETS—SHEET 2.
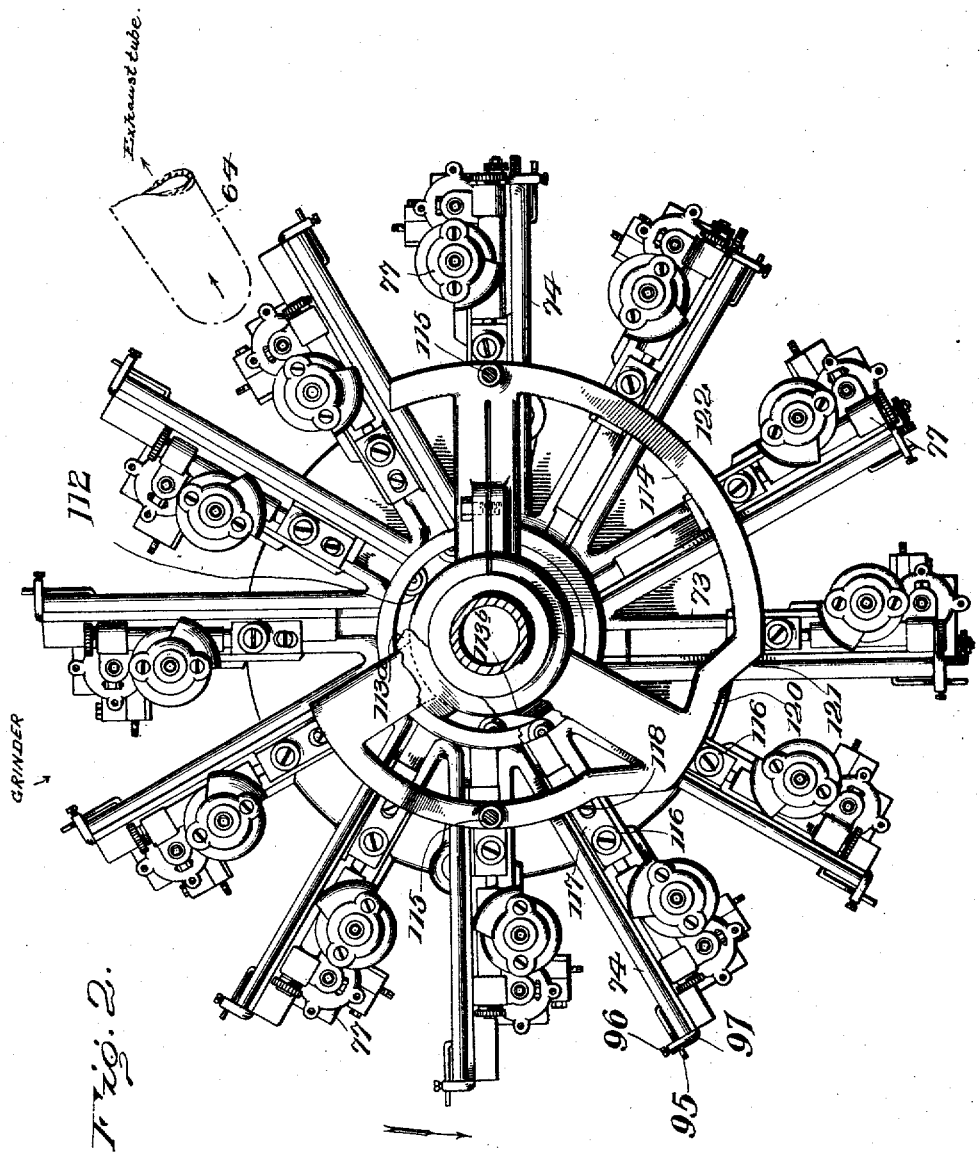

P. F. DUSHA, A. FEYK & J. KOMANCSEK.
BUTTON MAKING MACHINE.
APPLICATION FILED DEC. 28, 1911.
1,121,337.
Patented Dec. 15, 1914.
13 SHEETS—SHEET 3.
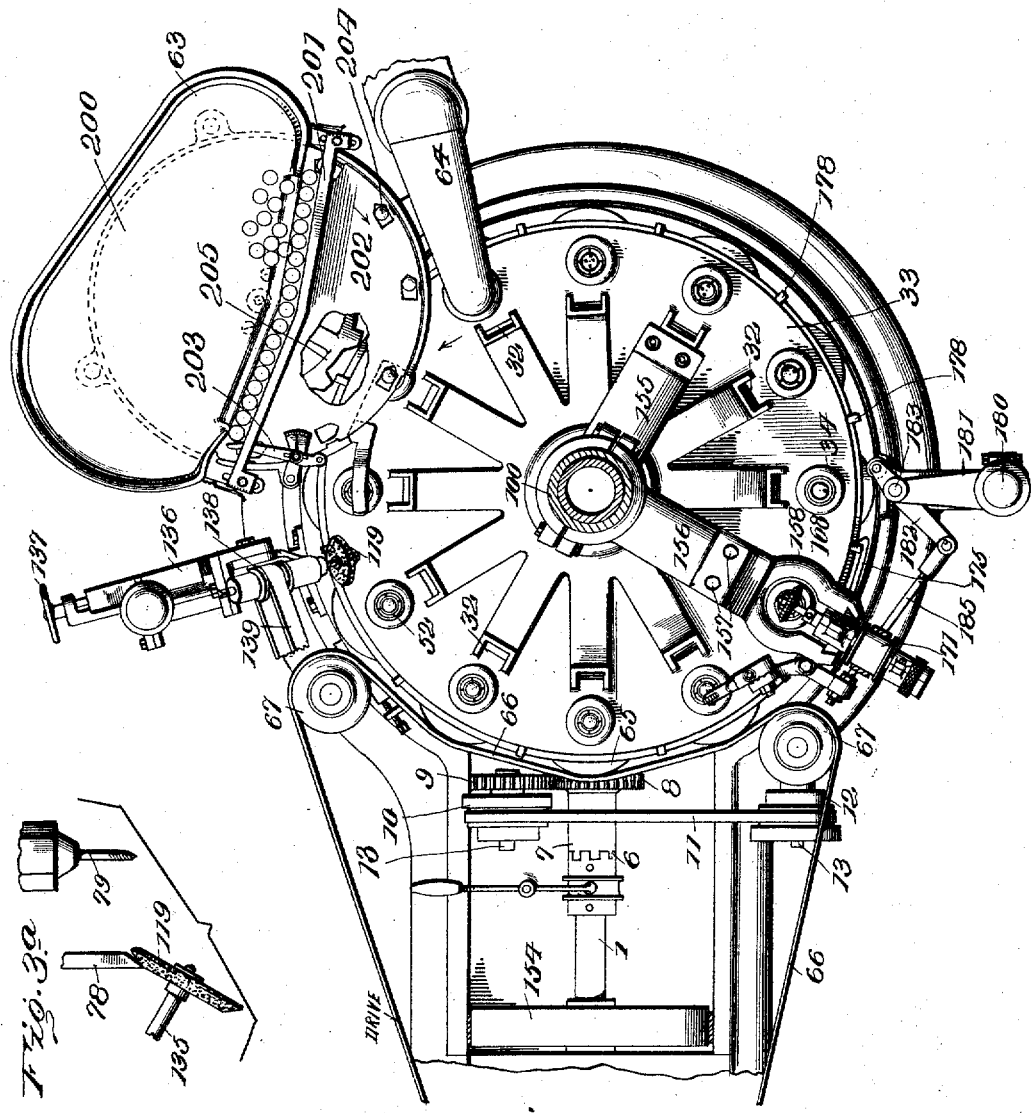

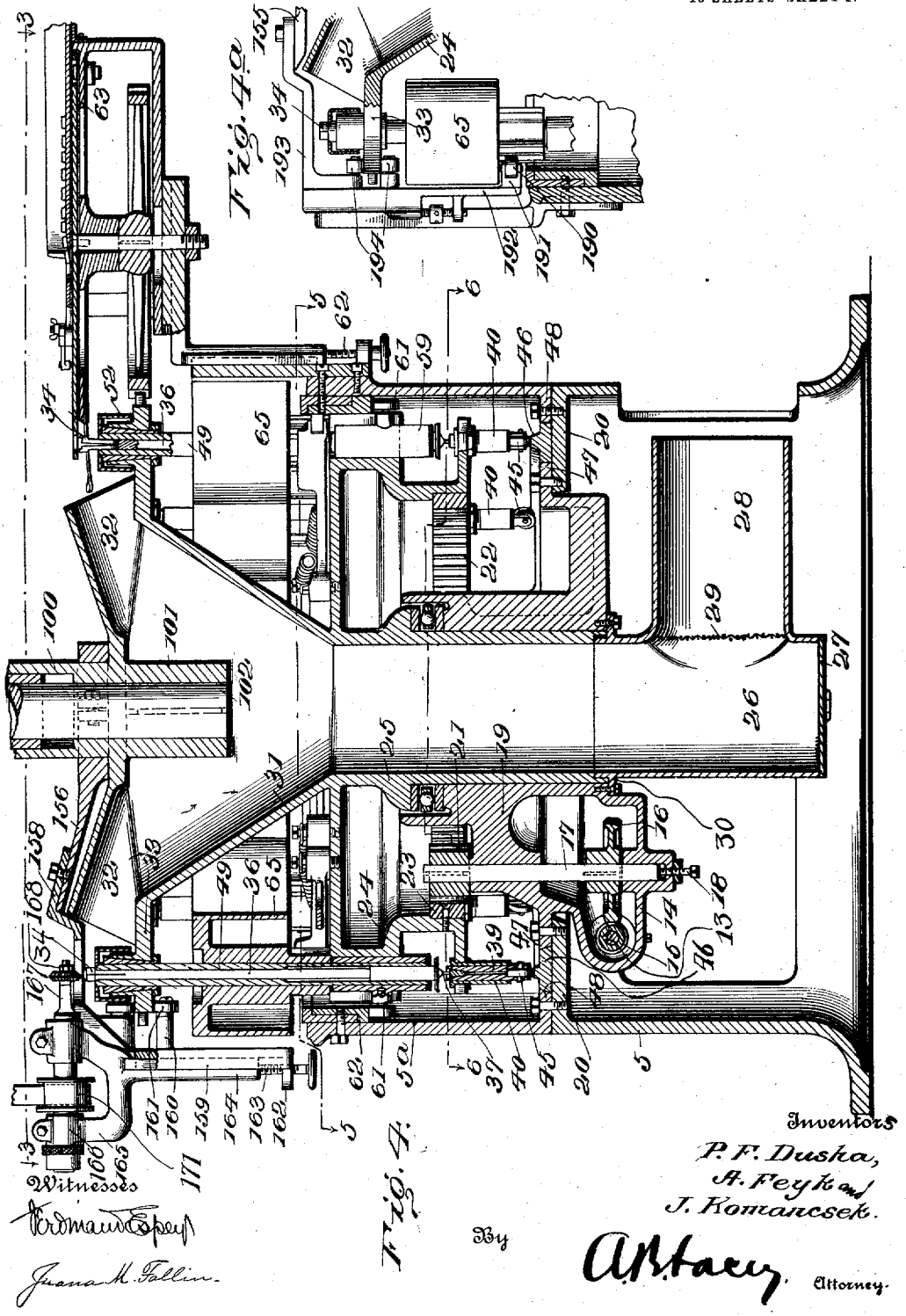

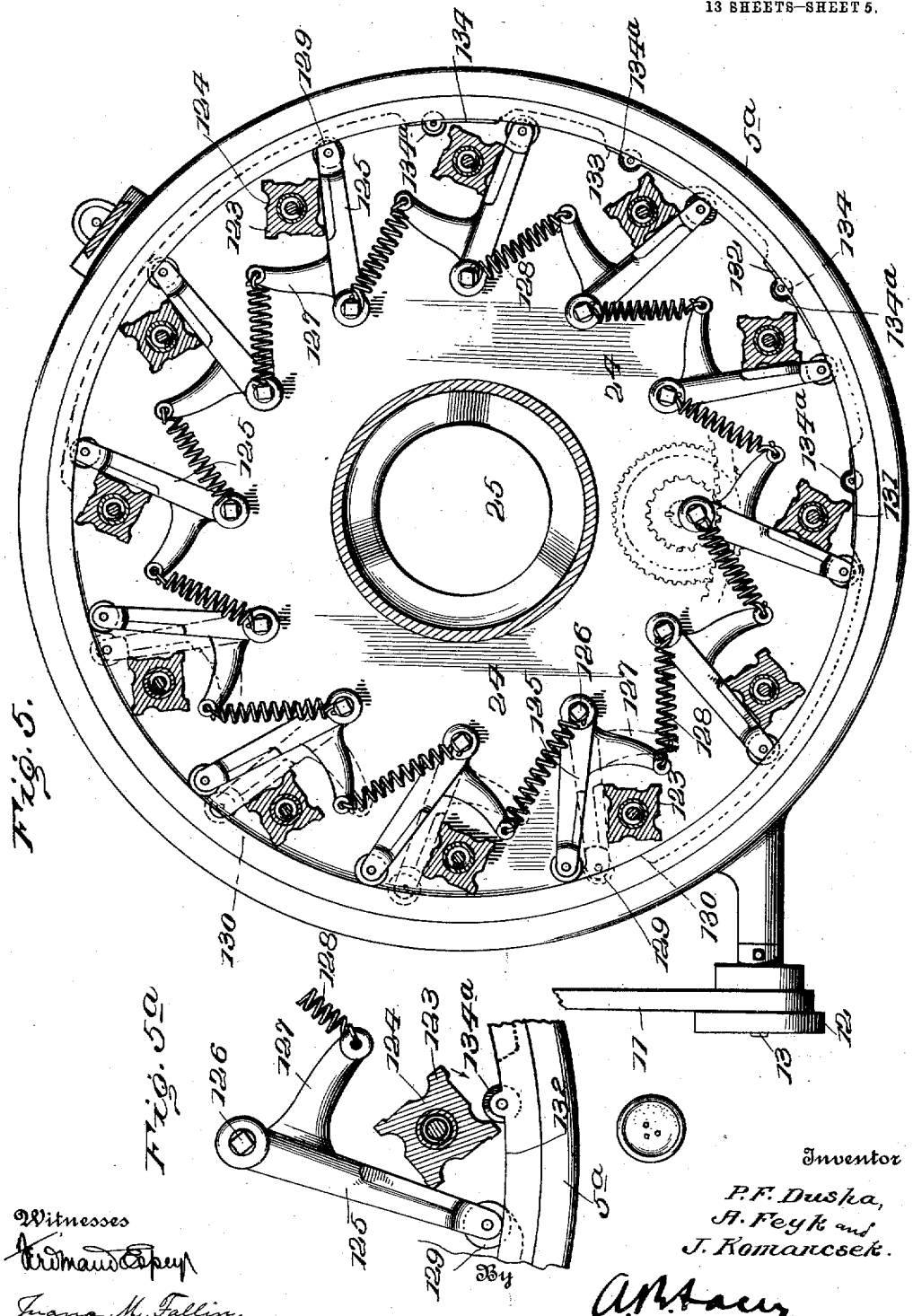

P. F. DUSHA, A. FEYK & J. KOMANCSEK.
BUTTON MAKING MACHINE.
APPLICATION FILED DEC. 28, 1911.
1,121,337.
Patented Dec. 15, 1914.
13 SHEETS—SHEET 6.
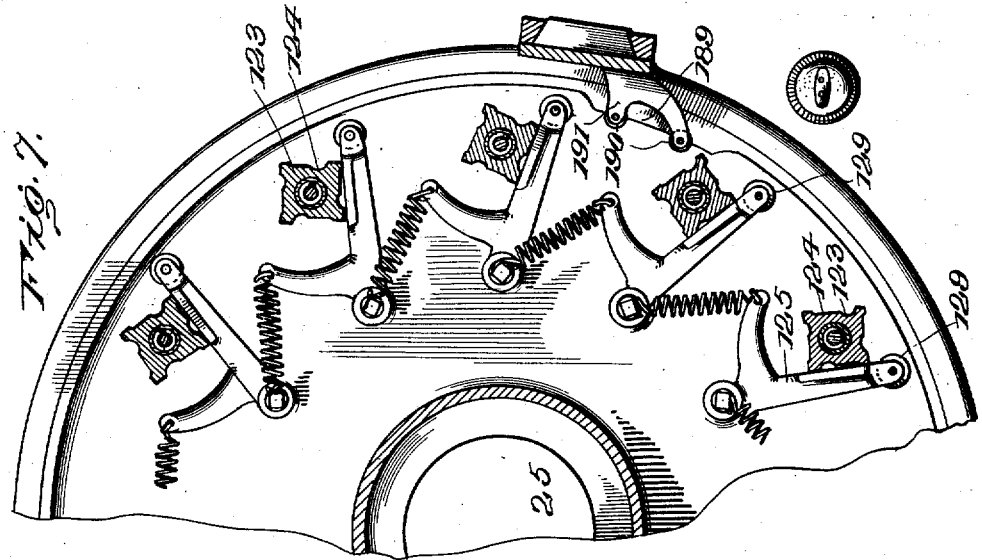
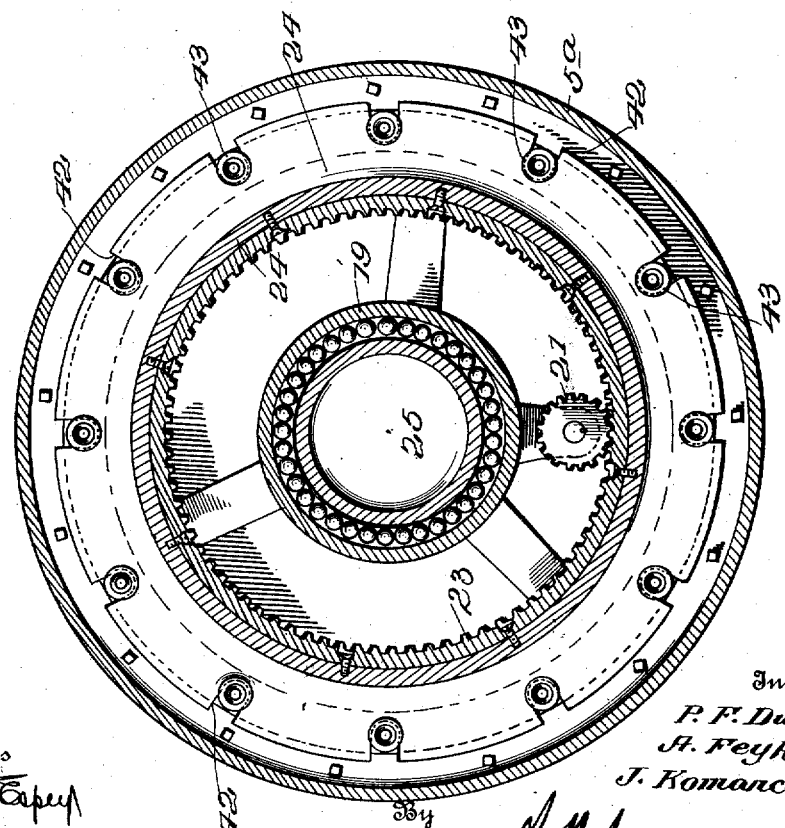

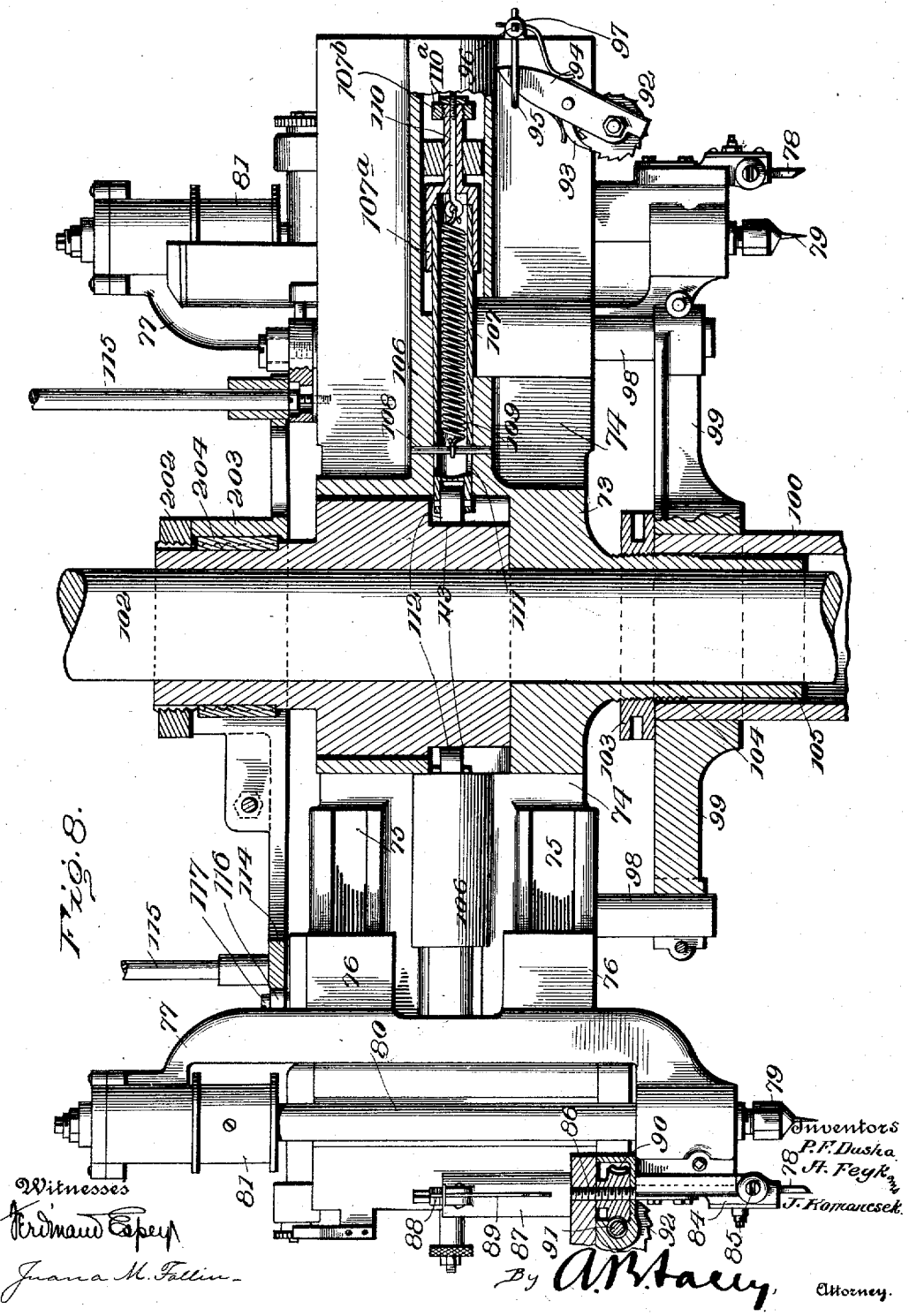

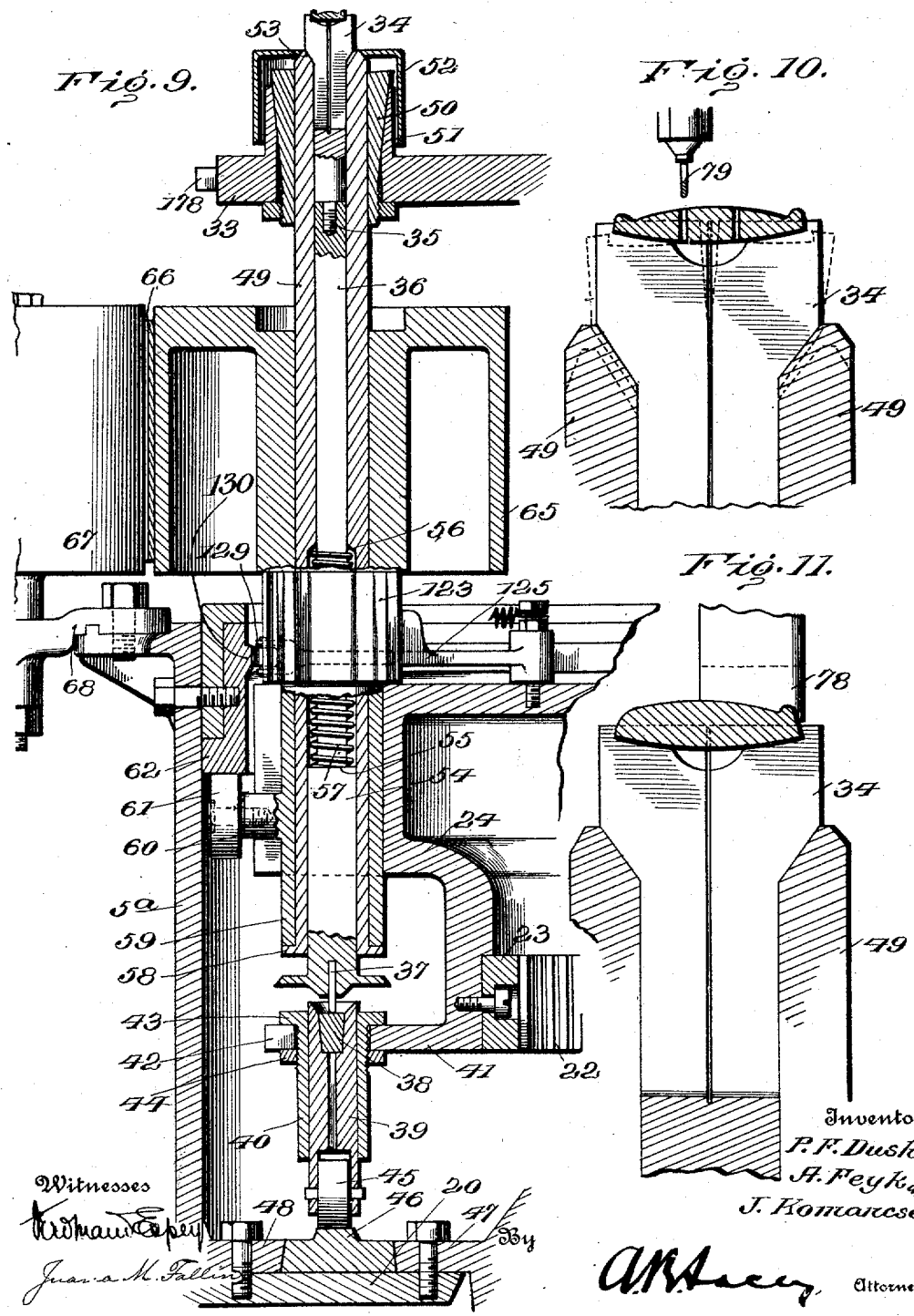

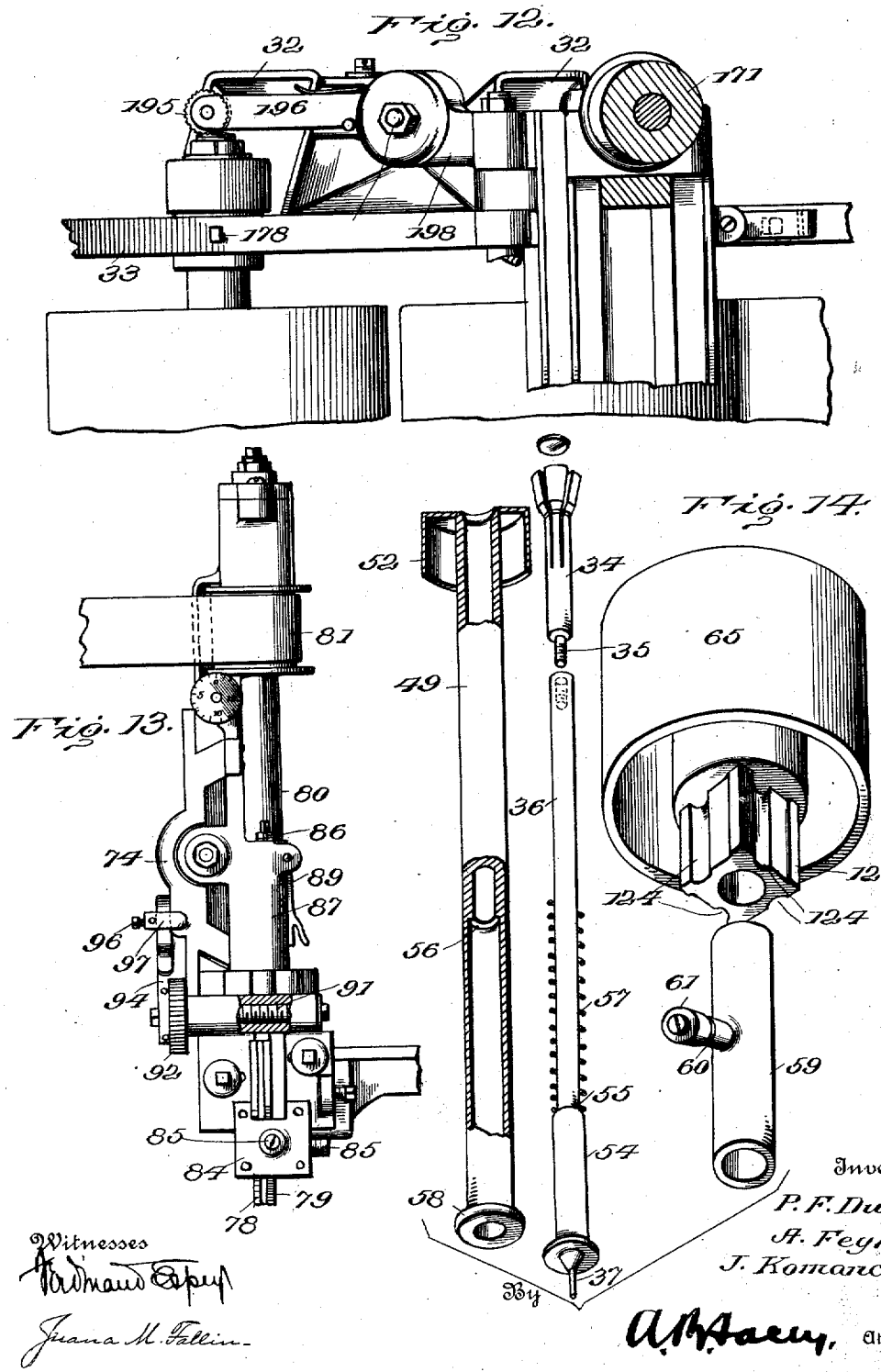

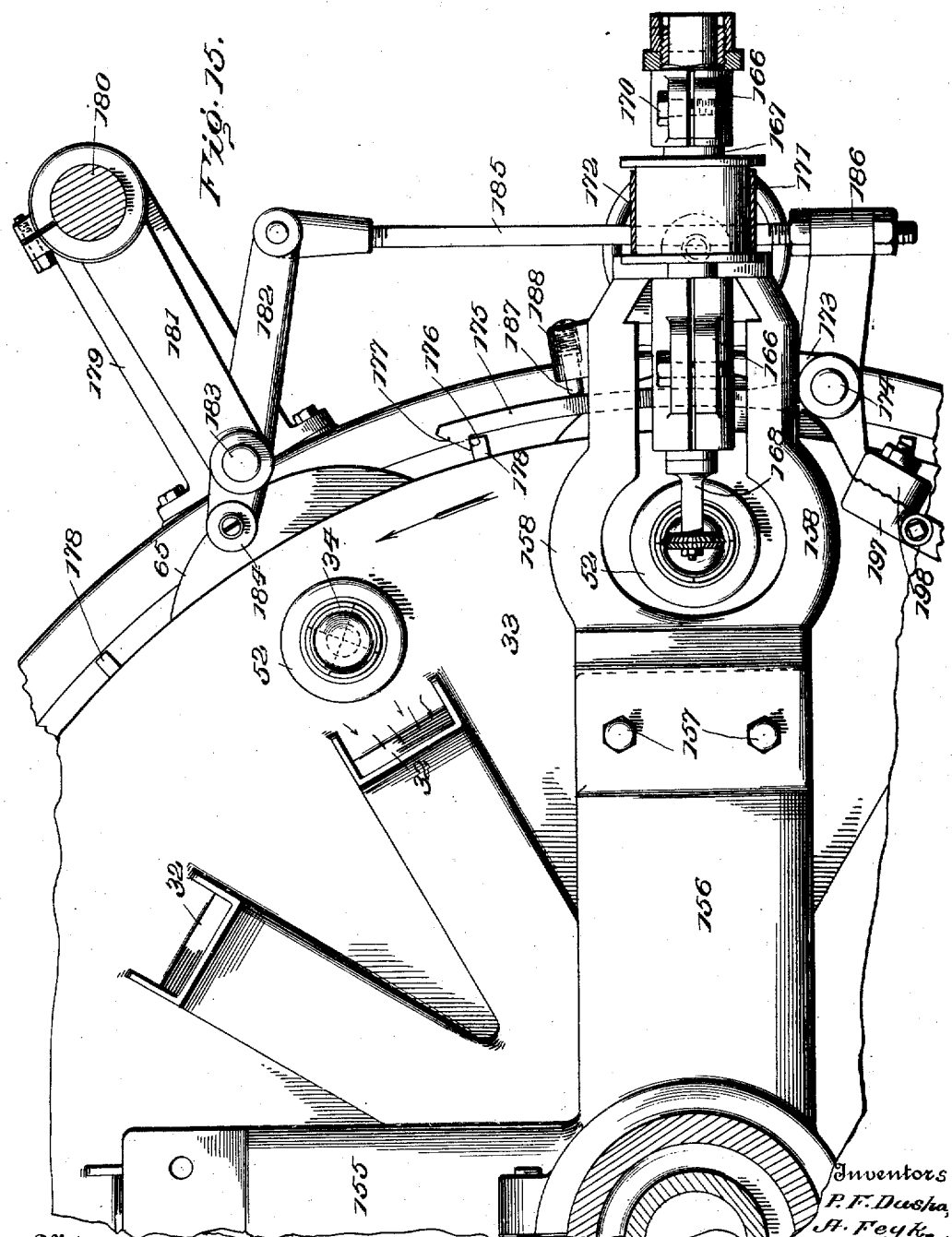

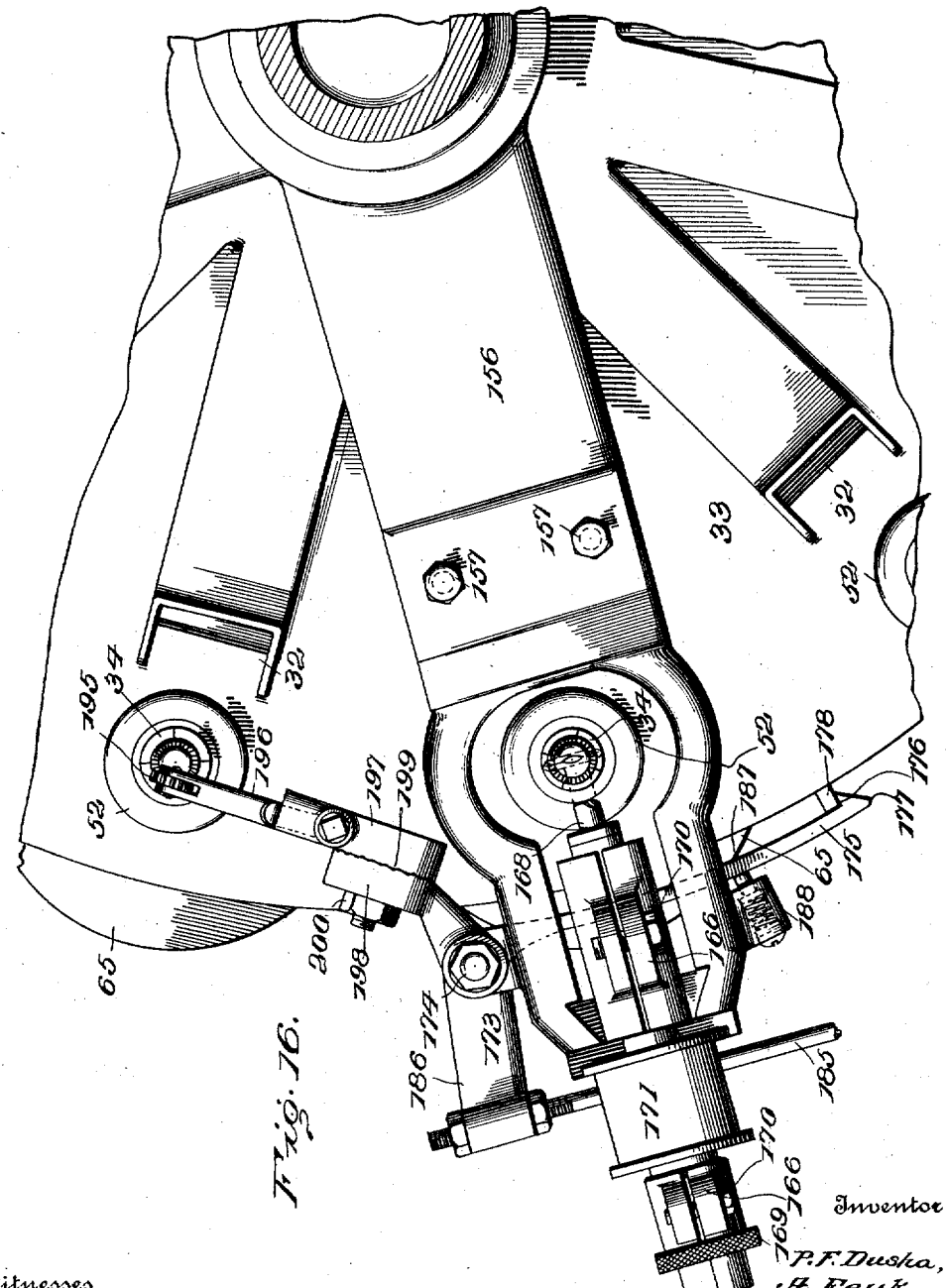

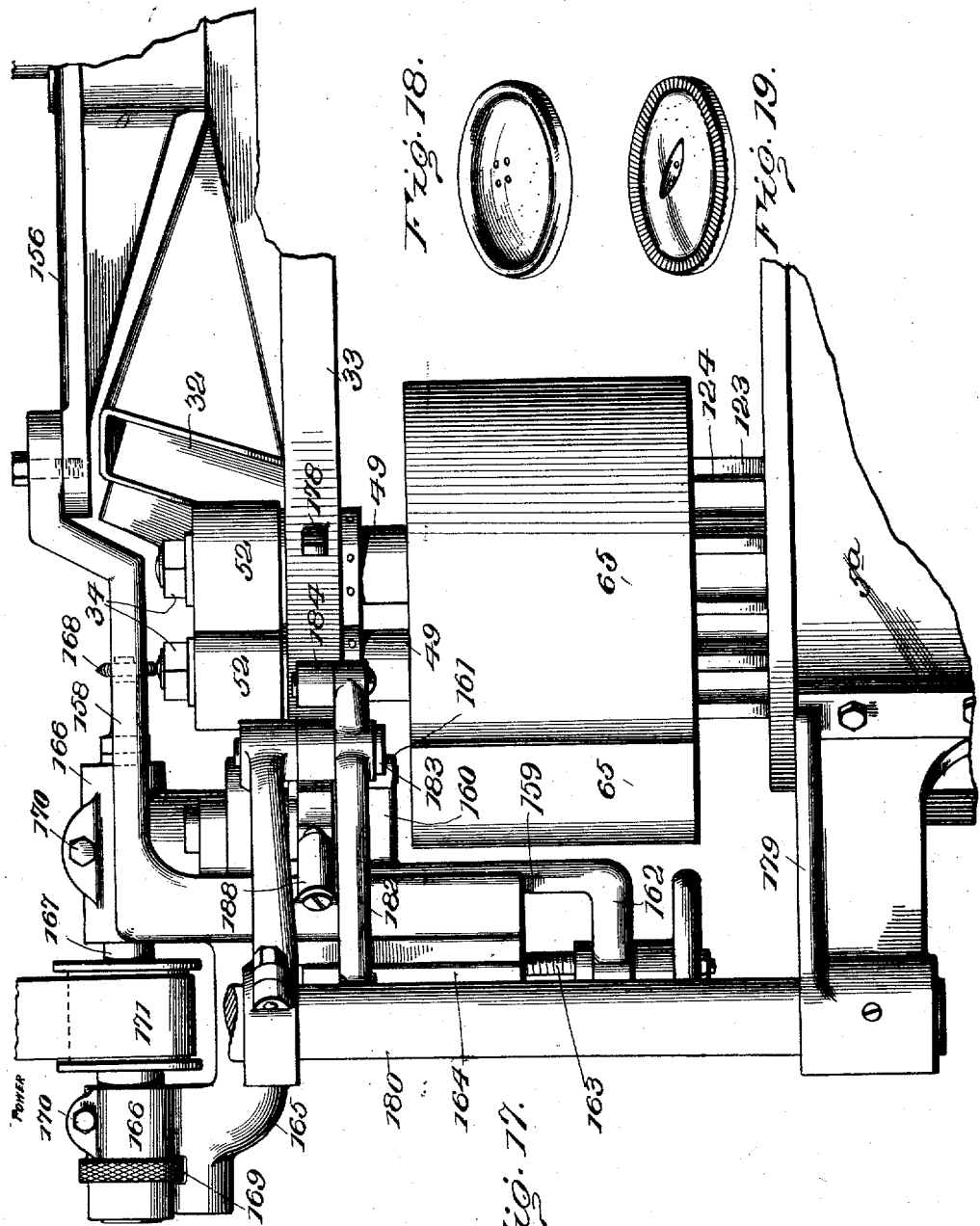

P. F. DUSHA, A. FEYK & J. KOMANCSEK.
BUTTON MAKING MACHINE.
APPLICATION FILED DEC. 28, 1911.
1,121,337.
Patented Dec. 15, 1914.
13 SHEETS—SHEET 13.
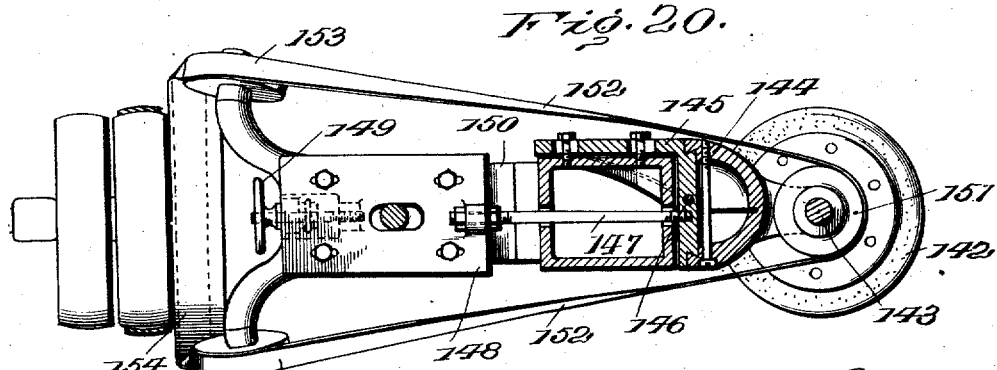
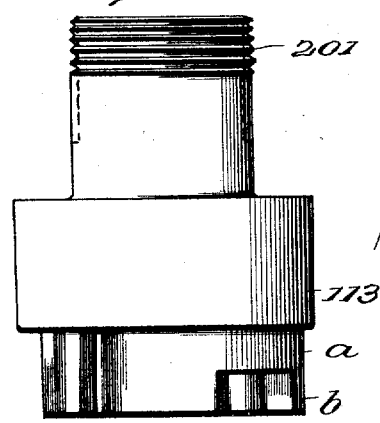
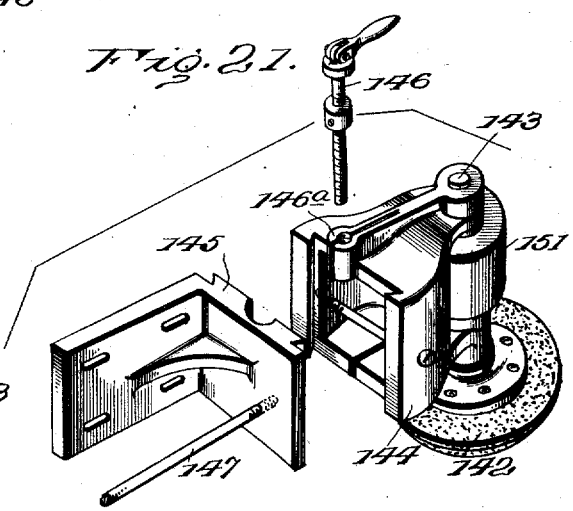
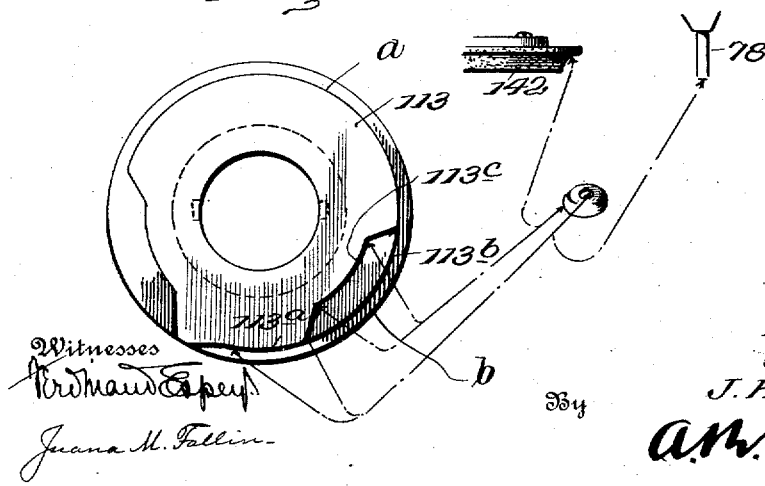

UNITED STATES PATENT OFFICE.

PAUL F. DUSHA, ANTON FEYK, AND JOSEPH KOMANCSEK, OF NEW YORK, N. Y., ASSIGNORS TO HOLUB-DUSHA COMPANY, OF NEW YORK, N. Y.

BUTTON-MAKING MACHINE.

1,121,337.  Specification of Letters Patent.  Patented Dec. 15, 1914.

Application filed December 28, 1911. Serial No. 668,252.

*To all whom it may concern:*

Be it known that we, PAUL F. DUSHA, ANTON FEYK, and JOSEPH KOMANCSEK, citizens of the United States, residing at New York, in the county of New York and State of New York, have invented certain new and useful Improvements in Button-Making Machines, of which the following is a specification.

This invention comprehends certain new and useful improvements in machines for making buttons, and the invention has for its primary object a button forming machine which will be practically automatic in all of the operations of facing, grinding, drilling and the other operations of transforming button blanks into the completed articles.

The invention also has for its object a machine of this character embodying a revoluble drum or chuck carrying table and a plurality of sets of facing and drilling tools carried thereby, the parts being so constructed and arranged that the blanks will be received in the machine from a feeding device and be carried around in the machine and faced and drilled one after the other so as to produce a practically continuous operation, the completed buttons being finally and preferably automatically discharged from the machine preferably at about the same point that the blanks are fed into the machine.

The invention also has for one of its primary objects a button forming machine applicable for use in forming fish eye buttons, as well as buttons of other types, the machine being capable of quick and easy adjustment of parts, whereby the blanks may be first faced and then drilled so that four thread receiving holes are formed; or, if desired, first faced, then formed with a fish eye, and then immediately or subsequently formed with two thread receiving holes, in the continuous operation of the machine.

The invention has for a further object a machine of this type embodying a plurality of tool holders each of which carries a facing tool and a drill, said tool holders being automatically movable in a radial direction as they are carried around in the revoluble movement of the chuck supporting table, whereby the blanks may be first faced and subsequently, by this radial movement of the tool holder, have the bits or drills brought into vertical alinement with the blanks, whereby the automatic upward movement of the chuck will cause the blank to be carried against the drill and the holes formed in the blank.

A still further object of the invention is a button forming machine which will include simple and efficient means for automatically rotating the chucks during the face forming operation, automatic means for locking the chucks one after the other, so as to prevent their rotation immediately after the face forming operation has been completed, and automatic means for intermittingly imparting partial rotations to the chucks, between which rotations the chucks are locked, whereby the blanks may be given either quarter or half turns as one hole after the other is drilled, according to whether four or two holes are to be formed in the blanks.

The invention also has for its object a machine of this character wherein the facing tools are ground and kept sharp in the continuous operation of the machine without the necessity of stopping the same, and wherein slight downward movements are imparted by automatic means to the facing tools after predetermined intervals, so as to compensate for the worn edge thereof.

A further object of the invention is a button forming machine in which all dust particles or grindings from the shells will be effectively disposed of in the continuous operation of the machine, thereby not only tending to maintain hygienic conditions for the operators, but to also protect the bearings of the operating elements of the apparatus.

A further object of the invention is a button forming machine including a novel fish eye forming mechanism wherein the fish eye tool is mounted for oscillation through a predetermined arc of the circle in which the series of chucks revolve, the parts being so arranged that when a blank reaches the fish eye tool and is raised to operative engagement therewith, the rapidly rotating tool will be carried along at the same speed with the chuck until the fish eye has been formed, and will then be automatically released and quickly returned to its initial position ready for operation upon the next blank in the series.

The invention also aims to produce a machine of this general character which can be easily adjusted so as to give either quarter or half turns to the blanks in the drilling operation, according to the number of thread receiving holes it is desired to form therein.

The invention also aims to produce a button forming machine provided with a beading or milling attachment which is so arranged that it can form a milled edge in the blank, if the same be desired, this attachment being capable of ready disconnection when not desired for use.

The invention also aims to produce a button forming machine which is capable of adjustment so as to readily and automatically form buttons of the three-quarter bore type, as will be hereinafter more fully described. And the invention also aims to generally improve this class of machines and to render them exceptionally useful, capable of a wide range and large amount of work, and generally more commercially desirable.

With these and other objects in view, as will more fully appear as the description proceeds, the invention consists in certain constructions, arrangements and combinations of the parts that we shall hereinafter fully describe and claim.

For a full understanding of the invention, reference is to be had to the following description and accompanying drawings, in which:

Figure 1 is a side elevation of one form or embodiment of our improved button forming machine, the speed changing pulley forming part of the driving mechanism of the machine being shown in section; Fig. 2 is a horizontal section through the machine on the line 2—2 of Fig. 1; Fig. 3 is a similar view, the section being taken substantially on the line 3—3 of Fig. 4; Fig. 3ᵃ is a detail view illustrating a facing tool grinder which may be used; Fig. 4 is a vertical transverse sectional view of the lower portion of the machine; Fig. 4ᵃ is a detail view of one form of automatic chuck returning device, hereinafter specifically described; Fig. 5 is a horizontal sectional view on the line 5—5 of Fig. 4; Fig. 5ᵃ is a detail view thereof; Fig. 6 is a horizontal sectional view on the line 6—6 of Fig. 4; Fig. 7 is a fragmentary view somewhat similar to Fig. 5 and showing the parts arranged for a half-turn of the blank carrying chucks, so that after one thread-receiving hole has been formed therein, a second hole will be automatically formed therein diametrically opposite to the first named hole; Fig. 8 is an enlarged sectional side elevation of the star wheel or spider which carries the radially disposed tool holders hereinbefore mentioned; Fig. 9 is an enlarged detail sectional view through one of the chucks; Figs. 10 and 11 are detail views, on an enlarged scale, of portions of the chucks and the tools that operate to drill and face the blanks; Fig. 12 is a fragmentary view illustrating the milling or beading tool and its support; Fig. 13 is an end view of one of the tool holder supporting arms; Fig. 14 illustrates in detail and in detached and juxtaposed relation to each other, some of the parts of the chuck; Fig. 15 is an enlarged fragmentary top plan view of the chuck supporting table, illustrating particularly the fish eye tool and its concomitant parts; Fig. 16 is a similar view taken in a slightly different position to show the milling or beading tool; Fig. 17 is a side elevation of that portion of the machine where the fish eye forming tool is located; Figs. 18 and 19 are views of two forms of buttons that may be made in the machine and which are hereinafter more specifically referred to. Fig. 20 is a horizontal sectional view, the section being taken substantially on the line 20—20 of Fig. 1; Fig. 21 is a perspective view of parts of the support for the grinder used in facing buttons of the three-quarter bore type; Fig. 22 is a detail view of one of the cams employed and hereinafter specifically described; and Fig. 23 is a bottom plan view of said cam, this figure illustrating, in the nature of a diagram, the tools and the position of said cam for boring and grinding the three-quarter bore buttons.

Corresponding and like parts are referred to in the following description and indicated in all the views of the drawing by the same reference characters.

The power to operate the machine may be supplied from any suitable source and is transmitted to the machine by a main shaft 1 on which are fast and loose pulleys 2, said shaft being journaled in a post or standard 3 of a supporting framework which may be of any desired construction or type, just so long as it can support and house the actuating elements of the apparatus, said framework in the present instance including a foundation 4 and a cylindrical base 5, connected to or formed integral with the foundation. The inner end of the driving or main shaft 1 preferably has a clutch connection 6 with a shaft 7 that carries a spur gear wheel 8, the latter meshing with a corresponding wheel 9 movable with and driving a stepped pulley 10. The pulley 10 is connected by the driving belt 11 to a corresponding but oppositely positioned pulley 12, and said last-named pulley is secured to a countershaft 13 arranged parallel to the main driving shaft 1 and extending into the base 5, where it is journaled in a housing 14 and provided with a worm 15. The worm 15 meshes with a worm gear 16 which is secured to a vertically disposed spindle 17 preferably mounted on a thrust bearing 18 in the housing 14. The upper end of the spindle 17 is journaled in a casting 19, of which the housing 14 preferably forms a part, said casting being supported on and secured to the inwardly extending annular flange 20 formed on the upper end of the base 5, and said upper end of the spindle 17 has keyed or otherwise secured to it a horizontally disposed spur pinion 21 which meshes with the interior teeth 22 of a ring 23 which is bolted or otherwise secured to a revoluble drum 24 which carries the chucks and their correlated devices, as will be hereinafter more fully described.

The drum 24 is mounted to rotate about a central vertical axis and is formed with a vertically disposed centrally positioned dust discharging passage 25 which leads into a dust collector or trap 26 provided with a detachable closure 27 and formed with a branch 28 to which there may be secured or operatively connected any desired form or construction of suction device, a screen 29 being secured in one end of the branch 28 so as to prevent the shell particles and dust from entering into the branch, compelling them to drop into the trap 26, from which they may be easily removed.

In the present construction of the machine, the upper end of the trap 26 is formed with an outwardly extending flange 30 secured to the lower end of the casting 19, the hollow hub of the drum 24 which forms the discharge passage 25 having a scarfed joint with the upper edge of the trap. As best illustrated in Fig. 4, in connection with Fig. 3, it will be seen that the passage 25 of the hub 24 leads downwardly from an upwardly flared chamber 31, formed in the drum, said chamber in turn communicating at its upper end with a series of radially disposed and outwardly and upwardly projecting suction mouths 32 that are formed in the drum and that open at the upper surface of a circular table 33 which forms the upper end of the drum, the entrance ends of said mouths 32 lying contiguous to the respective chucks 34 which are designed to receive and hold the button blanks while the same are being acted upon.

In the present embodiment of the machine, there are twelve chucks arranged in a circular series around the margin of the table 33 at regular or equal intervals, although it is to be understood that our invention is not limited to this or any number of chucks.

Each of the chucks 34 is detachably connected at its lower end, as by a threaded connection 35 (see Figs. 9 and 14) to the upper end of a vertically disposed spindle 36; the lower end of said spindle being provided with a hardened steel pin 37 which has bearing on a hardened steel plug 38 which is carried by a stepped bearing 39 mounted for vertical movement in a sleeve 40. The sleeve 40 is suspended in an annular flange 41 projecting outwardly from the lower end of the drum 24, said flange being preferably formed with outwardly opening recesses 42 to receive the respective sleeves 40, whereby said sleeves may be easily slipped into place or removed, and when in place may be held in position by their flanged upper ends and lock or jam nuts 44. Each stepped bearing 39 is provided at its lower end with a roller 45, all of the rollers of the series being mounted to run upon a cam track 46 which is preferably made in sections, whereby one or more sections may be removed and others substituted therefor when it is desired to change the formation of the cam for different operations of the machine. The cam track 46 is preferably held in position between a flange 47 of the casting 19 and a corresponding flange 48 through which bolts extend to fasten upon the base 5 the upper section 5ᵃ of the main casing of the machine (see Figs. 1 and 4). Each spindle 36 is mounted in a tubular spindle 49 (see Figs. 9 and 14), the upper end of the spindle 49 being journaled in a bearing 50 clamped in a tubular boss 51 formed on and projecting upwardly from the table 33, said spindle preferably carrying a depending cylindrical skirt 52 designed to serve as a guard so as to prevent dust from getting into the bearings, and the upper extremity of the tubular spindle 49 is inwardly beveled as at 53 to engage the correspondingly formed intermediate portion of the chuck 34, whereby an upward movement of the spindle 49 relative to the chuck will tend to close the chuck, while a downward movement of the spindle will permit the chuck to open.

The lower end of the spindle 49 is cored out to receive the relatively large lower end 54 of the inner spindle 36, said end 54 and the upper end of the cored out portion of the spindle 49 forming shoulders 55 and 56 against which the ends of a spring 57 bear, the tension of said spring being exerted upon the shoulder 55 so as to tend to move the spindle 49 upwardly. The lower extremity of the spindle 49 is formed with an outwardly projecting annular flange 58 which is engaged by the sleeve 59 encircling the lower end of said spindle, said sleeve being formed with an outwardly projecting shaft 60 carrying a roller 61 that is designed to ride underneath and in engagement with a cam track 62 secured to the inner side of the casing section 5ᵃ at the upper edge of the latter. Consequently, it will be understood that at a predetermined point in the rotation of the table 33 and drum 24, of which it forms a part, the roller 61 will ride upon the swell portion of the cam track 62 so as to force the sleeve 59 downwardly, this resulting in a downward movement of the tubular spindle 49 and permitting the chuck 34 to open so as to permit the blank to be released and removed from the machine. This relatively low position of the spindle 49 is illustrated in dotted lines in Fig. 10. In the present embodiment of the invention, this opening of the chuck occurs when the chuck arrives close to the feed table 63, after the blank has been carried entirely around the machine and transformed into the completed article; and in the present instance, superjacent this point is a suction tube 64, so that as soon as the chuck has been opened to release the completed button, the suction of the tube 64 will automatically draw the button out of the chuck so as to permit the chuck to continue in its movement to receive another blank, it being understood that the cam track 62 is so arranged that the sleeve 59 will be held in its lowered position until another button blank has been deposited in and pressed down into the chuck, as will be better understood by reference to our co-pending application for patent for feeding devices for button forming machines, executed the 21st day of November 1911, and filed the 25th day of November, 1911, Serial No. 662,495.

The feeding mechanism comprises an inclined table 200 upon which the button blanks are placed. There is a ledge around this table for the greater portion of its circumference. The lower edge of the table, however, discharges onto a guideway defined by the lower edge of the table and a guide member 201. Beneath the table 200 and forming the bottom of the guideway is a rotary disk 202. The disk 201 is intended to rotate in a clockwise direction and the button blanks in the guideway are rotated or rolled circumferentially along the guideway, the blanks being thereby constantly fed toward the discharge end of the runway. Here the blanks are held by a detent and releasing arm 203 and at predetermined intervals the blanks are released one after another and permitted to drop into pockets 204 that are cut or otherwise formed in the disk 202 around the rim thereof, the pockets being preferably partly rectangular and partly V-shaped in order to center button blanks of different diameters.

The feeding disk 10 is intermittently actuated for a partial rotary movement by the successive and intermittent engagement of pins on the table 33 which engage with the notches or teeth of a wheel 205 which is mounted on the same shaft as the disk 202. The blanks are deposited one at a time in the pockets 204 and are carried around underneath the tray and out from under the latter until they pass into cutaway portions of a base plate disposed immediately beneath the disk 202. At the point where this base plate is cut away, the path of one of the pockets will intersect the path of and coincide with a subadjacent chuck 52 which at that point is in open position, the blank dropping into the chuck and the latter subsequently closing in upon it.

It is to be understood (see Fig. 3) that in the operation of the machine, when it is used to face the blanks before the drilling operation, the chucks as they revolve in a series and sweep successively underneath the feeding device 63 to receive the blanks to be worked upon, commence to rotate about their own axes in a horizontal plane, almost immediately after they leave the feeding table, the chucks continuing to rotate until the fish eye tool and drills are reached. To effect this rotation of the chucks, each of them carries a pulley 65 which is designed for operative engagement with one stretch of a substantially triangularly disposed driving belt 66 that passes over laterally spaced pulleys 67 carried by brackets 68 secured to the upper section 5ᵃ of the cylindrical casing of the machine, said driving belt passing around and receiving its motion from a variable speed pulley 69 secured to a vertical shaft 70 which is journaled in the standard 3 and which is provided at its lower end with a beveled pinion 71 meshing with a corresponding pinion 72 of the main driving shaft 1. Thus, it will be understood that as one pulley 65 after the other comes into contact with the first idler pulley 67 it will be engaged by the laterally traveling stretch of the belt 66, and be continuously rotated for the facing operation until it reaches the other idler pulley 67 at which time the pulley 65 will pass out of engagement with the driving belt 66 and be automatically locked in position, as will be hereinafter more fully described in connection with the description of the drilling and fish eye forming mechanisms.

Mounted above the table 33 which, with the other portions of the drum 24, constitutes the revoluble chuck carrying support of the machine, is a star wheel or spider 73 (see Fig. 2), which is provided with a plurality of outwardly and radially projecting arms 74, equal in number and arranged in substantially vertical alinement with the respective chucks 34. For a better understanding of the detail construction of these arms 74 and their correlated parts, reference is to be had to Figs. 8 and 13, particularly the former. These arms 74 are shown as relatively short in Fig. 8 as compared with Fig. 2 because of the relatively large scale of the drawing in Fig. 8 and the relatively small size of the sheet. Each arm is formed in one face with longitudinally extending guides 75 designed for sliding engagement with correspondingly formed lugs 76 formed on a tool holder 77. Each tool holder carries a facing tool 78 and a drill 79 arranged in predetermined spaced relation to each other, the distance between them being capable of change. The drill 79 is secured to the lower end of a vertically disposed spindle 80 journaled in the tool holder 77 and carrying a pulley 81. A driving belt 82 passes around the entire series of the pulleys 81 and receives its motion from a pulley 83 secured to the shaft 70 near the upper end of the latter, as best illustrated in Fig. 1. Each facing tool 78 is held in a boxing 84 and is frictionally supported therein by set screws 85 so that the facing tool may be fed downwardly when desired, as its edges are worn off, the upper end of the facing tool being engaged by a threaded stem 86 which works in a cylindrical casing 87 carried by the tool holder 77. This threaded spindle 86 is formed with any desired number of grooves 88 extending longitudinally and designed for engagement by a spline bar 89 and the lower end of the threaded spindle works through a worm gear 90 meshing with a worm 91 secured on the same shaft with a ratchet wheel 92. The ratchet wheel 92 is designed for engagement by a spring pressed pawl 93 carried by a rocking bar 94 that is designed for engagement with the hooked end of a rod 95, the outer end of which is adjustably secured, as by a set screw 96, in a laterally projecting end of a finger 97 carried by and secured in the outer end of the arm 74. At this point it is noted that the tool holder is arranged for an inward and outward sliding movement in a radial direction longitudinally of the arm 74 which supports it, and consequently when the tool holder moves inwardly, the hooked end of the rod 95 carried by the finger 97 of the arm will engage the free end of the rocking bar 94 and drag the pawl 93 over the teeth of the ratchet wheel 92, while a subsequent outward movement of the tool holder on the arm will permit the pawl to turn the ratchet wheel 92 a predetermined distance, according to the adjustment of the rod 95. This will manifestly turn the worm 91 and effect a partial rotation of the worm gear 90 so as to feed the threaded shaft 86 downwardly a slight distance and thereby force the facing tool 78 downwardly to compensate for the wear occasioned by its planing operation over the face of the blank.

The star wheel or spider 73 is formed with any desired number of downwardly projecting pins 98 rigidly connected by arms 99 to the upwardly projecting tubular hub 100 formed at the center of the drum 24 at the upper end of the latter and in which boss in the downwardly projecting portion 101 thereof (see Fig. 4) the lower end of the shaft 102 is keyed. By this means, it will be understood that the spider 73 may be vertically adjusted in order to bring the tools in proper position relative to the chucks, this vertical adjustment being rendered possible owing to the fact that the spider is supported on the upper end of the hub 100 by an interiorly threaded collar 103, which engages threads 104 on the downwardly projecting neck 105 of said spider or star wheel.

As hereinbefore stated, the tool holders 77 are mounted for inward and outward movement in a radial direction longitudinally of the arms 74. To effect this movement, the following instrumentalities are employed: Each arm 74 is formed with a tubular guide way 106, and to each tool holder 77 a tube 107 is secured, the tubes being movable in respective tubular guide ways 106. A pin 108 is secured in each tubular guide way 106, extending transversely thereof, and to each of said pins contractile springs, mounted within the respective tubes 107, are connected at their inner ends, said springs being designated 109. The outer ends of the respective springs 109 are secured to longitudinally adjustable bolts 110. The tubes 107 are each provided with a cap 107$^a$, this cap having a reduced shank screw threaded for a nut 107$^b$ and through the tubular reduced portion of the cap passes the adjusting bolt 110 which at its end is engaged by a nut 110$^a$. By adjusting the bolt 110, the tension of the spring 109 may be adjusted. The tubes 107 are longitudinally slotted near their inner ends, as at 111, to accommodate the pins 108, and each tube at its inner end is provided with a cam engaging roller 112 adapted to ride upon the relatively stationary inner and lower cam 113 surrounding the shaft 102. In addition to the lower and inner cam 113, the machine is equipped with an upper and outer cam track 114, the formation of which is best seen in Fig. 2, said last named cam being supported by suspension rods 115 forming part of the main supporting framework of the machine. Engageable with the cam 114 are rollers 116 journaled on the outer surfaces of blocks 117 that are carried by the radially movable tool holders 77, said blocks being inwardly and outwardly adjustable by slot and set screw connection, as indicated at 118. It will thus be seen that the tool holders are capable of a double adjustment relative to the cams 113 and 114, whereby the tool holders may be set inwardly or outwardly, and less or greater movement imparted to them in shifting from the facing tools to the drills, and vice versa, according to the particular requirements of the case, as, for instance, the diameter of the blanks being operated upon. For example, it is manifest that a greater movement of the tool support in a direction to shift the facing tool from the blank and bring the drilling tool at the proper position over the blank, might be necessary with blanks of different diameters, and as it is often necessary to vary the location of the drill relative to the blank, independently of the location of the facing tool in planing the face of the blank, according to the position where it is desired to drill the thread-receiving holes, these two independent adjustments are rendered necessary. At this point it is deemed necessary to describe the operation of shifting the tool holders in and out during a complete cycle of operations of the machine, and in this connection, reference is to be particularly had to Figs. 2 and 3.

In the operation of the machine, the tool holders 77 are held by their springs 109 at the innermost limit of their movement, in the revolution of the series of tool holders, from about the point where the tool holders pass underneath the blank discharging suction tube 64 until the point where the tool holders reach the grinder 119. Then, the rollers 112 ride outwardly upon the high part 113ᵃ of the cam 113, so as to move the tool holders outwardly a distance sufficient to bring the facing tools 78 directly above or in vertical alinement with the blanks in the chucks 34. In the continued movement of the revolving drum 24 and its table 33, it being now understood that the blanks are being faced by the facing tools 78, the rollers 116 will, at the end of the facing operation, ride upon the concentric portion 120 of the upper and outer cam 114, during which time the fish eye forming tool, hereinafter fully described, will operate upon the blank, if, of course, it be desired to form a button with a fish eye, in which event the chuck will be moved upwardly to engage the blank with the fish eye tool at this point, but will be otherwise passed underneath the fish eye tool so that the blank will not engage therewith. By the engagement of the rollers 116 with the portion 120 of the cam 114, the tool holders will be caused to move in a path which will bring the fish eye tool between the facing tools 78 and the drilling tool 79. In the continued revolution of the series of tool holders, the rollers 116 will successively ride outwardly upon the inclined portion 121 of the cam track 114 until they reach the outer concentric portion 122 thereof, by which they will be held in a position to maintain the tool supports in their outer positions, where, instead of the facing tools 78 being above and in direct vertical alinement with the blanks in the chucks, the drills 79 will be in such alinement. In the present embodiment of the invention, the outer concentric portion 122 of the cam track 114 terminates at a point just beyond where the drilling operation is completed, and the tool holders will then move inwardly, but without shock, as the rollers 112 will ride inwardly upon the low portion of the cam 113 until the high portion 113ᵃ is again reached in the continuous revolution of the drum. It will thus be seen that the cam tracks 113 and 114 will co-act with each other to produce the timely shifting movement of the tool holders on their supporting arms 74. The facing operation is performed between the grinder 119 and the fish eye forming tool (see Fig. 3) and the blanks are brought one after another in their chucks up to and into engagement with the facing tool 78 by a high part of the cam track 46 on which the rollers 45 ride, this portion of the cam track being gradually upwardly inclined in the direction of revolution, so as to gradually plane the faces of the blanks and prevent any breakage thereof, the said high portion being preferably so formed that at the completion of the facing operation the blanks will be very lightly engaging with the facing tools.

We shall first describe our machine as arranged for forming buttons of the style illustrated in Fig. 18, and will therefore omit for the present a description of the fish eye tool and the actuating mechanism therefor. Passing, then, to the drilling operation, wherein four thread receiving holes are formed in the blanks, in quartering relation with each other, it will be remembered, as stated hereinbefore, that the chucks were stated to be locked in the revolution of the drum and its table 33 as against any rotation of the chucks about their longitudinal axes, as soon as the facing operation had been completed. This is at the point, in the revolution of the drum, where the pulleys 65 pass out of engagement with the driving belt 66.

Secured to and practically forming a downward extension of each pulley 65 is a keeper 123 in the form of a substantially rectangular block formed in each of its four faces with a groove or depression 124. Latch arms 125 are arranged in a circular series on the top of the drum 24, said arms projecting outwardly from their pivot ends 126 toward and along one side of the respective keeper blocks 123 and designed to engage the corresponding sides of the respective blocks so as to prevent said blocks from accidentally turning. Each of the arms 125 is formed with a lateral extension 127 connected by a contractile spring 128 to the pivot stud of the next adjacent latch arm, whereby the said springs 128 will exert their tension upon the arms 125 to hold them in contact with the keeper block 123, so as to prevent the chuck spindles and chucks from rotating or from being turned.

The outer or relatively free ends of the latch arms 125 carry, respectively, rollers 129 which are designed to ride on cams secured to or formed as part of the ring which is provided with the cam track 62 (see Fig. 9) and it is to be understood that these rollers ride on a high portion of one of said cams from the time the spindles reach the first idler pulley 67 until they leave the other idler pulley 67 so as to hold the arms 125 entirely free from their corresponding keeper blocks, thereby permitting the chuck spindles and chucks to continuously rotate. As soon, however, as the chuck spindle passes the second of the idler pulleys 67 in the revolution of the drum, this cam, designated 130, terminates, and the latch arms will be automatically moved against one side of their corresponding keeper blocks so as to prevent said blocks from turning. The parts will be maintained in this relation to each other until the rollers reach the succeeding cams 131, 132, 133 and 134. When the first cam 131 is reached by one of the rollers 129, the roller will ride thereon, forcing the latch arm to be disengaged from the keeper block 123, while at the same time one edge or corner of said block will meet a roller 134ª journaled in the cam, whereby said roller will ride into the adjoining recess 124 of the keeper block and thereby impart a one-quarter rotation to the block and the spindle and chuck of which it forms a part. This will happen immediately after the first thread receiving hole has been drilled in the blank; the keeper will be again immediately thereafter locked by the latch, again released, and given another turn by the next roller after the second hole has been formed in the blank, and the third and fourth turns will be correspondingly imparted to the chucks until the four holes have been drilled in quartering relation to each other, as will be manifest by special reference to Fig. 5. After the fourth hole has been drilled, the latch arms 125 will hold the chuck spindles relatively stationary until the facing operation is again to be performed in the continued revolution of the chuck support. It is to be understood that the cams 131, 132, 133 and 134 are not indispensable, as the engagement of the rollers 134 with the keepers 123 will force the latch arms 125 rearwardly so as to permit the keepers and spindles to be turned.

A hole is to be drilled in the blank immediately before the chuck is turned, as hereinbefore described, by providing raised portions of the track 46, as is evident, the chucks, in their spindles, being raised into engagement with the drill to form the first hole, then lowered and turned and raised to form the second hole; then lowered and turned and again raised to form the third hole, and then lowered and turned and raised to form the fourth or final hole, after which the completed button passes underneath the suction tube 64, while at the same time the chuck is opened and the blank is sucked out through the tube 64 and deposited in any suitable receptacle (not shown). Fig. 5ª shows the position of one of the keeper blocks 123 released and being turned after the third hole has been drilled in the button and just preparatory to the formation of the fourth thread receiving hole.

As has been hereinbefore stated, each facing tool is moved down slightly automatically once during each complete revolution of each tool, for the purpose of taking up wear, and it has also been stated that the facing tools are reground or sharpened during their circular traverse around the machine. To perform this regrinding or sharpening operation, we have provided the grinder disk 119 before mentioned, said disk being supported in an oblique position with its grinding face disposed outwardly, whereby the operator may at all times view the grinding operation. The disk 119 is secured to the inner end of a shaft 135, which is mounted in an inwardly and outwardly adjustable bracket 136 which may be adjusted by the operator manipulating the hand wheel 137, whereby the grinding operation may be accurately performed. The shaft 135 is provided with a pulley 138, and a driving belt 139 passes around said pulley, said belt passing over idlers 140, and thence around a driving pulley 141 secured to the main shaft 1.

From as much of the description as has preceded, in connection with the correlated views of the accompanying drawings, the operation of forming, by our machine, a button of the type illustrated in Fig. 18 will be apparent, as the operations of the different elements of the machine have been described in detail together with their details of construction and their relative arrangement. For the sake of clearness, however, we may state that after the blanks are transferred from the feeding device 63 to the revolving and rotating chucks 34, they are carried by said chucks around the machine, are first faced, are then drilled, and are finally sucked out of the machine through the tube 64, each button as it is sucked out having its place taken by a fresh blank and the operation of the machine being thereby a practically continuous one.

It is to be understood that our invention is not limited to forming the faces of the blanks by tools such as those illustrated at 78. The machine is adapted for use in forming the faces of the blanks by grinding. In order to adapt the machine for this purpose, we have provided a grinder disk 142, secured to the lower end of the shaft 143 which is journaled in a bracket 144, vertically slidable on a guide-way 145, so as to bring it to the proper elevation for the grinding operation, the vertical adjustment being effected by an adjusting screw 146 which is mounted in a bearing 146ª formed on the bracket 144, and which works in an opening formed for it in the front face of the guide-way 145. The horizontal adjustment of the bracket 144 is effected by means of a horizontal rod 147 secured at its outer end to a slide 148 adjustable by means of a hand wheel 149 (see Fig. 20), and mounted upon a horizontally projecting bracket 150. To turn the grinding disk 142, we have provided the shaft 143 with a pulley 151 around which a driving belt 152 passes, said belt also passing around idler pulleys 153 and around a band wheel 154 carried by the main driving shaft 1. This grinding mechanism just described is hereinafter referred to again, in describing the machine as adapted for forming buttons of the three-quarter bore type, such as is shown in Fig. 23 and is also referred to in our co-pending application for patent for a button forming machine arranged particularly for use in forming buttons of the "self shank" type, said application being filed on the 28th day of December, 1911, Serial No. 668,253.

As is indicated at several points throughout the preceding portion of the specification, our button forming machine is adaptable for making buttons of the fish eye type with a grooved face in which two diametrically opposite thread receiving holes are formed. We shall now describe specifically the fish eye forming tool and the means for operating it. Supported upon and movable freely on the outwardly projecting tubular hub 100 of the revoluble drum 24 is a casting provided with two arms that are in the present instance extended at right angles to each other, one of said arms, designated 155, being designed for use when the machine is arranged as disclosed in our co-pending application just referred to, and the other arm designated 156, having detachably secured thereto, as by stud bolts 157 or similar fastening devices, an angular divided bracket 158 one end of which projects downwardly past the table 33 to form a vertically disposed guide member 159 which is provided with an inwardly projecting stud 160 on which a roller 161 is journaled, said roller bearing against the under surface of the table 33 at the rim thereof, so as to assist in properly guiding the arm 156 and bracket 158 in their movement, which is a vibrating or oscillating one about the boss 100 as a vertical axis. The lower end of the guide member 159 of the bracket 158 is formed with a laterally projecting apertured ear 162 through which a vertically disposed adjusting screw 163 works, said screw bearing against the lower end of a vertical arm 164 which is mounted for a vertical sliding movement in the guide member 159. The upper end of the arm 164 is forked, as at 155, to form two journal bearings 166, in which a horizontally disposed shaft 167 is journaled, said shaft carrying on its inner end the fish eye forming tool 168 which is mounted in the space formed between the divided portions or branch arms of the substantially horizontal portion of the bracket 158, so that as the blank in the chuck is raised, it may be engaged with the fish eye forming tool to form a fish eye for a button of the type illustrated, for instance, in Fig. 19. Preferably, the shaft 167 is longitudinally adjustable, whereby the fish eye tool may be properly centered for the blank, the adjustment in the present instance being secured through the instrumentality of a thumb nut 169 swiveled in a bearing on the outermost branch of the forked upper end 165 of the arm 164, the shaft being securely held for adjustment by the clamping bolts 170. The shaft 167 carries a pulley 171 around which a driving belt 172 passes, said belt also passing around idlers 172ª and being driven by a wheel 172ᵇ secured to the upper end of the shaft 170. An ear 173 projects laterally from the divided horizontal portion of the bracket 158 in a direction opposite to the direction of rotation of the table 33, and a vertically disposed stud 174 is carried by said ear. A preferably curved latch 175 is pivotally connected at one end to the stud 174 to swing in a horizontal plane, said latch extending from its divided end in a direction coincident with the direction of rotation of the table, and the free end of said latch is formed with a hook 176 terminating in a beveled extremity 177. The hook 176 is designed for engagement by pins 178 projecting from the peripheral edge of the table 33 at predetermined and equal intervals, the pins being designed to successively engage the hooked end of the latch 175 so as to move the arm 156 and the tool supporting bracket 158 in the same direction as the table 33 and at the same speed as said table, for a distance sufficient to permit the tool 168 to complete the formation of the fish eye in the blank. It is, of course, to be understood that during this simultaneous and coincident movement of the chuck and fish eye forming tool the tool will be continuously rotated and the chuck will be locked as against rotation about its own axis and will be raised up into proper engagement with the tool.

It is manifest that after one fish eye has been formed, the tool 168 must be very quickly brought back to its initial position ready to operate upon the next succeeding blank within the revolving series of blanks. To accomplish this, the following mechanism for releasing the latch 175 and returning the arm 156 and its supported parts to their initial positions is provided. Secured to the bracket 179 projecting laterally from the casing section 5ª, as best seen in Fig. 17, is an upwardly projecting post 180, to the upper end of which is adjustably clamped an inwardly extending lever supporting arm 181. A lever 182 is fulcrumed near one end of the arm 181, as indicated at 183, and the inwardly projecting other arm of said lever carries at its extremity a roller 184, while the outer and longer arm of said lever is pivotally connected to a link rod 185 that is in turn adjustably connected to the outer end of a bar 186, secured to stud 174 and movable thereon independently of the fulcrumed latch 175. In the operation of these parts, as the table 33 revolves underneath the pivoted horizontally extending portion of the bracket 158, one of the pins 178 will engage the hook 176 of the latch 175, said latch being pressed inwardly by means of a pin 187, spring pressed toward the latch and mounted in a hollow boss 188 formed on one side of the bracket 158. The pin 178 will thus engage the latch and will cause the arm 156 and its supported members to move around with the table 33 at the same rate of speed, while during this movement the rapidly rotating fish eye forming tool 168 will form the fish eye or groove in the face of the blank. In this movement of the parts, the relatively free extremity of the latch 175 will be brought into engagement with the roller 184 and said roller will ride against the beveled edge 177 and free the latch from the pin, while immediately thereafter the pin will engage the roller and by the continued movement of the other and longer arm of the lever 182, move said lever in a direction to quickly return the arm 156 and the parts which it carries to their initial position ready for a subsequent similar operation upon the next succeeding blank in the series.

It is well known that buttons of the fish eye type are not formed with four thread receiving holes, but with only two holes, the same being located in the groove or fish eye and disposed diametrically opposite to each other. Consequently, in the machine equipped as hereinbefore described, with means for operating the drills four times, some means must be provided for omitting some two of the four drilling operations; that is, for example, either the first and third, or the second and fourth. It is also manifest that some means must be provided for twice turning the blank and the chuck in which it is clamped between the two remaining drilling operations, so that the blank will be completely reversed in position after the first hole has been drilled and before the second hole is drilled. To accomplish this with the present machine, we substitute for the cam which will raise the chucks into operative relation to the drills four times in the travel of the chuck, cams which will act on the rollers 45 of the chuck supporting spindles only once after the first drilling operation has been performed, and interpose in the path of movement of the rollers 129 of the latch arms 125 a cam 189 which will hold the latch arms 125 free from engagement with their corresponding keeper blocks 123 while said blocks are engaged twice by two closely spaced rollers 190 carried by the inwardly projecting lower end 191 of a vertically disposed guide member 192 which is secured to the outer end of an angular bracket 192 fastened to the arm 155, which, as before mentioned, is primarily designed for attachments disclosed in one of our co-pending applications herein mentioned, but which is equally applicable for use with the attachment comprised by the parts 190, 191, 192 and 193. Preferably, the downwardly projecting outer end of the bracket 193 carries upper and lower rollers 194 engaging the upper and lower surfaces of the table 33 at the rim or edge thereof so as to assist in guiding the arms 155 and 156 in their oscillating movement.

From the description which has just preceded, it will be understood that after the first thread receiving hole has been drilled in the fish eye blank, the spindle and chuck carrying said blank will be given two quarter turns, and that immediately thereafter the chuck will be again raised into operative relation to a drill to form the second thread receiving hole in diametrical relation to the first hole, the chuck being then locked as against rotation and carried underneath the tube 64 at which point the chuck will be opened and the completed button automatically removed therefrom.

In order to form the button blanks with milled rims, we have provided our improved button forming machine with a milling tool 195 which is in the form of a transversely ribbed or corrugated roller carried in the outer forked end of an arm 196 spring pressed in a downward direction and carried by a bar 197 which is pivotally connected for a vertical adjustment of the roller 195 to one end of a complemental bar 198 secured to the spindle 174, before mentioned. Preferably, the adjoining faces of the bars 197 and 198 are serrated, as at 199, whereby they will be securely held together in adjusted position after the clamping nut 200 has been tightened up.

As hereinbefore stated, our machine is capable of also forming buttons of the three-quarter bore type, one of which is illustrated in detail in Fig. 23. This button has a relatively large bore extending through it three-fourths of the thickness of the button, the remaining portion of the button being drilled for the passage of the thread. In order that the machine may make buttons of this type, as well as the other buttons hereinbefore specifically referred to, the cam 113 is a compound cam. It is shown in detail in Figs. 22 and 23, and in assembled relation to the other parts in Figs. 2 and 8. This cam is formed in its lower end with an upper cam face $a$ and with a lower cam face $b$. The upper cam face $a$ includes the high portion 113$^a$ which is continued, as at 113$^b$, whereby the tool holders are held in such position that the facing tools 78 will continuously work on the blanks, in the continued revolution of the chuck carrier, from the point where the facing tools are ground to the point where the fish eye forming tool is located. The lower face $b$ also contains a high portion 113$^a$, but such portion in this face of the cam merges into an inner portion 113$^c$ located where the grinding disk 142 is positioned. The cam 113 is vertically adjustable, as will be shortly described, and hence it will be understood that when said cam is in the lower position where the face $a$ will engage with the rollers 112, the tool holders 77 will be continuously held in position for effecting the planing or facing of the blanks from the time the chucks leave the grinder 119 up to the point where they reach the fish eye forming tool 168. When, however, the cam 113 is moved upwardly so as to bring the face $b$ in alinement with the rollers 112, the tool holders 77 will be held in position for effecting the engagement of the blanks with the facing tools only from the point where the grinder 119 is located up to the point where the facing grinder 142 is located, at which time the spindles will be lowered to disengage the blanks form the facing tools and will be again immediately raised into engagement with the facing disk 142, while at the same time the rollers 112 will reach the depressed portion 113$^c$ of the cam, whereby the tool holders will be moved inwardly by their springs 109 and the tools 78 and 79 moved completely out of the way of the face grinding disk 142. In this adjustment of the cam 113 just mentioned, the facing tools will make a three-quarter bore in the blanks, as indicated diagrammatically in Fig. 23 and the grinder disk 142 will then face the blanks, the blanks being then passed on to the drilling tools which will form two thread receiving openings in the bottom of the bore, by the same arrangement of parts as has been hereinbefore described with reference to forming such openings in buttons of the fish eye type.

In order to effect the vertical adjustment of the cam 113, said cam is formed with an upwardly projecting exteriorly threaded neck 201 which is designed for engagement by an adjusting nut 202 resting upon a hollow boss or collar 203 formed by the center of the cam track 114 and being part thereof. The neck 201 preferably has a keyed or splined connection 204 with said boss or collar 203. In the lowermost position of the cam 113, where its face $a$ is in alinement with the rollers 112, said cam rests upon the casing 73 (see Fig. 8). In order to vertically adjust the cam the nut 202 is turned, whereupon the cam 113 will be raised vertically, this movement being limited by the engagement of the top portion of the cam with the bottom of the collar 203, at this time the face $b$ of the cam coming into proper alinement with the rollers 112.

The action of the cam will be best understood by reference to Fig. 23. In this figure, the part 78 designates the drill. 142 is the grinder. The dotted line leading from the central perforation of the button and merging into two lines which lead to the part 113$^a$ shows that portion of the cam at the time that the drill 78 is forming the perforation in the button. The dotted line which leads from the side of the button and which merges into two lines leading to the part 113$^c$ of the cam 113, and the dotted line which leads to the grinder 142 shows that part of the cam 113 which is active at the time that the grinder 142 is in operation.

From the foregoing description in connection with the accompanying drawings, the operation of our improved button forming machine will be apparent and no further description of the operation is deemed necessary.

It is to be understood that when the machine is arranged for making buttons of the fish eye or three-quarter bore types, it is not necessary to use the attachment which includes the rollers 190, because it is only necessary to omit two of the rollers 134$^a$ (see Fig. 5) and to use the other two of said rollers so as to give two quarter turns to the chuck spindles in the interval between the drilling of the first hole and the drilling of the second hole. For example, after the first hole has been drilled and the cam 131 reached and the adjacent roller 134 has imparted the first one quarter turn to the chuck spindle, the cam 133 and its roller may impart a second one quarter turn to the chuck spindle, the second hole being then formed in the blank, and the cams 133 and 134 and their rollers omitted, as it would not then be necessary to again turn the blanks.

It will be obvious that by changing the position of the several rollers 134$^a$ it will be possible to change the point at which the blanks will be drilled, it being borne in mind, however, that it is only necessary to give two complete quarter turns to the chuck spindle between the first and second drilling operations in order that the blank may be completely reversed for the formation of the second hole. It is also to be understood that while the accompanying drawings disclose what we believe to be the preferred embodiment of our invention, the invention is not limited thereto, but that various changes may be made in the construction, arrangement and proportions of the parts within the scope of the claims.

Having thus described our invention, what we claim is:

1. A button forming machine, including a movable chuck carrier, chucks carried thereby, means for facing blanks in said chucks during the movement of the carrier, drilling tools movable with the carrier above the chucks, means for actuating the drilling tools to form a thread-receiving opening in the blanks, and means for subsequently lowering the chucks, turning them, and again raising them into engagement with the drilling tools to form a second hole in the blanks.

2. A button forming machine, including a revoluble chuck carrier, chucks carried thereby, a spider provided with radial arms movable with said carrier, said arms carrying radially shiftable tool supports provided with facing and drilling tools, and means for automatically shifting said tool carriers radially for the purpose specified.

3. A button forming machine, including a revoluble chuck carrier, chucks carried thereby, a spider provided with radial arms movable with said carrier, said arms carrying radially shiftable tool supports provided with facing and drilling tools, and means for automatically shifting said tool holders on their arms during the continued movement of the carrier.

4. A button forming machine, including a revoluble chuck carrier, chucks carried thereby, a spider movable with said carrier and embodying radially disposed arms, tool holders longitudinally shiftable upon said arms and provided with facing and drilling tools engageable with the blanks carried by the chucks, and cams mounted in the machine and engageable with said tool holders, for the purpose specified.

5. A blank forming machine including a movable chuck carrier, a chuck carried thereby, a facing tool movable with the carrier and engageable with the blank carried by the chuck, a support for said tool, and means for feeding the facing tool with its support, outward in a horizontal plane during the movement of the carrier.

6. A button forming machine, including a revoluble chuck table, chucks carried thereby, the table being formed with a series of ducts with outwardly and radially opening mouths located contiguous to the chucks, and means for working on blanks in said chucks, and a drum, of which the table forms a part, the drum being formed with an axially located dust collecting passage extending downwardly from and common to all of said mouths, and a dust collecting trap at the bottom of said passage.

7. A button forming machine, including a casing, a hollow chuck carrying drum mounted for revolution in said casing and provided with a circle of inwardly facing teeth, chucks carried by said drum, means for working on blanks in said chucks during the movement of the drum, a pinion meshing with said teeth, a spindle journaled in the casing and carrying said pinion, a worm gear secured on said spindle, a worm shaft provided with a worm meshing with said worm gear, and means for driving said worm shaft.

8. A button forming machine including a rotatable casing, a rotatable drum rotating with the casing and provided with a downwardly extending tubular axis forming a suction passage, the drum being formed with upwardly opening mouths communicating with said passage, chucks carried by the casing contiguous to the respective mouths, and means for working on blanks in said chucks.

9. A button forming machine, including a movable chuck carrier, a rotatable chuck supporting spindle mounted in said carrier, means for rotating said spindle, a many sided keeper movable with said spindle, and a latch mounted on the chuck carrier engageable with said keeper at a predetermined point in the movement of the carrier.

10. A button forming machine, including a movable chuck carrier, a chuck supporting spindle rotatable therein, a keeper movable with said spindle in its rotation, means for rotating said spindle, means for working on a blank, during the rotation of said spindle, a latch on the chuck carrier arranged to engage said keeper, and means for moving the latch automatically into engagement with the keeper at the completion of said work.

11. A button forming machine, including a movable chuck carrier, a chuck supporting spindle rotatable therein, a keeper movable with said spindle in its rotation, means for rotating said spindle, means for working on a blank during the rotation of said spindle, a latch mounted on the chuck carrier and arranged to engage said keeper, means for moving the latch automatically into engagement with the keeper at the completion of said work, and means for holding the latch automatically out of engagement with the keeper during such work.

12. A button forming machine, including a movable chuck carrier, a chuck, a chuck holding spindle rotatable in said carrier, a keeper rotatable with said chuck spindle, a spring pressed latch mounted on the chuck carrier engageable with said keeper to hold the chuck spindle from rotating at a predetermined point in the movement of the carrier, and means for holding the latch free from engagement with the keeper prior to the arrival of the latter at such point.

13. A button forming machine, including a movable carrier, a chuck, a chuck holding spindle rotatable in said carrier, a keeper rotatable with said spindle, a pivoted latch arm spring pressed toward the keeper and provided at one end with a roller, and a cam engageable with said roller and arranged to hold the latch out of engagement with the keeper, said cam terminating at a predetermined point in the movement of the carrier.

14. A button forming machine, including a movable chuck carrier, a chuck, a chuck holding spindle rotatable with said carrier, a keeper rotatable with said spindle, a spring pressed latch arm pivotally connected to the carrier and engageable with the keeper at a predetermined point in the movement of the carrier, and means for automatically subsequently releasing the latch from the keeper and for engaging the keeper to impart a turning movement thereto and to the spindle at a later point in the movement of the carrier.

15. A button forming machine, including a revoluble chuck carrier, a plurality of chucks, a plurality of rotatable chuck spindles mounted in the carrier and carrying said chucks, a plurality of latches, one for each chuck spindle, secured to the carrier, keepers rotatable with the respective chuck spindles and engageable by said latches and means for automatically freeing said latches from said keepers at predetermined points in the movement of the carrier.

16. A button forming machine, including a movable chuck carrier, chuck supporting spindles rotatable therein, chucks supported by said spindles, keepers rotatable with the spindles, latch arms supported by the carrier and automatically movable into engagement with said keepers to hold the chuck spindles from rotation, means for facing blanks in said chucks during a portion of the traverse of the chucks, means for automatically holding the latches out of engagement with said keepers during the facing operation, means for subsequently drilling the blanks held in said chucks, and means for intermittingly releasing the latches from the keepers and for engaging the keepers to turn the same and the chuck spindles during the drilling operation.

17. A button forming machine, including a movable chuck carrier, a chuck, a rotatable chuck spindle holding said chuck and mounted in the carrier, a keeper rotatable with said spindle and formed with recesses, a latch mounted on the chuck carrier automatically engageable with said keeper to hold the chuck from rotation, a cam adapted to engage said latch to release it from the keeper, and means for immediately thereafter engaging said keeper in a recess thereof to turn the keeper and the spindle, in the movement of the carrier.

18. A button forming machine, including a revoluble chuck carrier, a plurality of chuck supporting spindles rotatable in said carrier, chucks carried by the respective spindles, keepers rotatable with said spindles, the keepers being in the form of rectangular blocks formed in their faces with recesses, a plurality of latch arms pivoted at one end in a circular series on said carrier and projecting outwardly from their pivotal points and engageable with said keepers to prevent the turning movement of the spindles, the respective latch arms being formed with lateral extensions, springs connecting the respective extensions to the adjacent latch arms at the pivot points of the latter, rollers carried by the outer ends of said arms, means for automatically engaging said rollers to free the latch arms from the keepers, and relatively stationary rollers engageable in the recesses of said keepers to impart partial rotation thereto, as and for the purpose set forth.

19. A button forming machine, including a movable chuck carrier, a rotatable chuck spindle carried thereby, a chuck supported by said spindle, a keeper rotatable with said spindle, a drilling tool movable with said carrier, a latch arm also movable with said carrier and engageable with said keeper to prevent the rotation of the spindle, and means for automatically freeing the latch arm from the keeper, for subsequently engaging the keeper to impart a partial rotation thereto, and for subsequently engaging the latch with the keeper and for effecting an engagement of the blank in the chuck with the drill.

20. A button forming machine, including a movable chuck carrier, a rotatable chuck spindle carried thereby, a chuck supported by said spindle, the spindle being also mounted for axial as well as a rotatable movement, a keeper movable with the spindle in its rotary and axial movements, a latch carried by the chuck carrier and automatically engageable with the keeper to prevent the rotation of the chuck spindle without interfering with the axial movement thereof, a drilling tool movable with the carrier, means for moving the chuck spindle axially to carry a blank supported by the chuck into engagement with said tool, and means for freeing the latch from the keeper and for imparting a turning movement to the spindle.

21. A button forming machine, including a movable chuck carrier, a chuck carried thereby, a tool holder, facing and drilling tools carried by said holder, a supporting arm for the holder movable with the carrier, the holder being longitudinally slidable on its support, means tending to draw the tool holder inwardly on its support, and means for moving the tool holder outwardly on its support, for the purpose specified.

22. A button forming machine including a revoluble chuck carrier, a plurality of radially disposed chucks carried thereby, a plurality of radially disposed series of tools mounted above the chuck carrier and rotatably therewith, means for automatically shifting the tools of each series radially during a portion of the rotation of the chuck carrier to bring one or the other of the tools into working position relative to the corresponding chuck, and means for relatively moving the chuck and tools to bring the tool into or out of operative engagement with the button carried in the chuck.

23. A button forming machine, including a movable chuck carrier, a chuck carried thereby, a tool holder, facing and drilling tools carried by said holder, a support for said holder movable with the carrier, the holder being slidably mounted on its support, a spring operatively connected to the holder and tending to draw the same inwardly on its support, and a cam engageable by a portion of the holder and arranged to move the latter outwardly on its support, for the purpose specified.

24. A button forming machine, including a movable chuck carrier, a chuck carried thereby, a tool holder, facing and drilling tools carried by said holder, an arm movable with the carrier and on which the tool holder is longitudinally slidable, means for moving the tool holder longitudinally on its supporting arm, and a force feeding device for said facing tool and actuating means therefor, said actuating means embodying a ratchet and pawl and a pivoted bar carried by the tool holder, and a rod carried by the supporting arm and adapted to engage said bar in one movement of the tool holder relative to its support.

25. A button forming machine, including a movable chuck carrier, a chuck carried thereby, a tool holder, facing and drilling tools carried by said holder, an arm movable with the carrier and carrying the tool holder, and a force feeding device for said facing tool and actuating means therefor, said actuating means embodying a ratchet and pawl, a pivoted bar carried by the tool holder, and an adjustable rod carried by the supporting arm and adapted to engage said bar in one movement of the tool holder relative to its support.

26. A button forming machine including a revoluble chuck carrier, chucks carried thereby, a revoluble tool carrier disposed above the chuck carrier and rotatable therewith, radially shiftable tool supports mounted upon the tool carrier, facing and drilling tools carried by each of said supports, and means for automatically shifting said tool supports radially as and for the purpose described.

27. In a button forming machine, a central rotatable drum having an axial tubular extension, the end of said drum opposite the extension being formed with a plurality of radiating dust collecting mouths, a chuck carrier rotatable with said drum, chucks supported thereby adjacent the mouths, means operating upon the face of the blanks carried by said chucks, and a fixed tubular member alining with the tubular extension of the drum and adapted to be connected to a suction creating means.

28. A button forming machine including a rotatable chuck support, a plurality of chucks carried thereby, and a milled edge forming attachment including a supporting member movable coincidentally with the rotatable chuck support for a predetermined distance, means for releasing said last mentioned support and returning it to its original position after said predetermined movement, and a milling cutter carried by said support.

29. A button forming machine including a rotatable chuck support, a plurality of chucks carried thereby, means for rotating said chucks, a milling tool support movable for a predetermined distance with the chuck support, and means for returning the milling tool support to its original position after said predetermined movement, said milling tool support including a spring pressed arm and a milling cutter mounted upon the extremity of the arm.

30. A button forming machine including a rotatable chuck support, a plurality of chucks carried thereby, means for rotating the chucks, and a resiliently supported milling cutter mounted to engage with the face of the blank held in said chuck and to move with said chuck for a predetermined distance while the cutter is operating on the blank, and to return to its initial position after said predetermined movement.

31. In a button forming machine, a rotatable chuck support, a plurality of chucks carried thereby means for rotating the chucks, an arm rotatable upon an axis common to the chuck support, means for engaging said arm with the chuck support for common movement for a predetermined distance and then disengaging said arm and returning it to its original position after said predetermined movement, a bracket supported upon said arm, an arm pivotally mounted upon said bracket for movement in a vertical plane, a resilient member extending from said arm, a milling cutter mounted upon said resilient member, means acting to lift the chuck to carry the blank into engagement with the milling cutter, and means for simultaneously rotating the chuck.

In testimony whereof we affix our signature in presence of two witnesses.

PAUL F. DUSHA. [L. S.]
ANTON FEYK. [L. S.]
JOSEPH KOMANCSEK. [L. S.]

Witnesses:
JOSEPH FRANKFURTHER,
AUGUSTUS PHILIPPSON.

Copies of this patent may be obtained for five cents each, by addressing the "Commissioner of Patents, Washington, D. C."